(No Model.)
C. L. COFFIN.
ELECTRICALLY HEATED SOLDERING IRON.
No. 508,284. Patented Nov. 7, 1893.
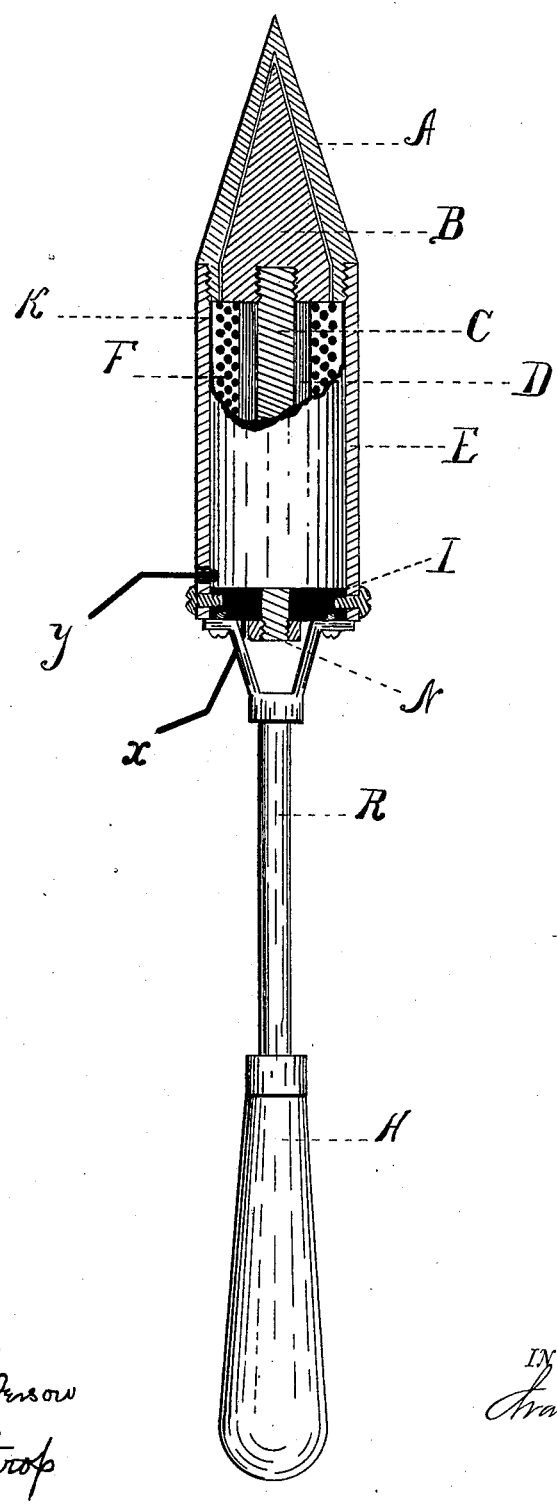
WITNESSES
Gertrude H. Anderson
Geo. N. Lothrop
INVENTOR
Charles L. Coffin

UNITED STATES PATENT OFFICE.

CHARLES L. COFFIN, OF DETROIT, MICHIGAN, ASSIGNOR TO THE AMERICAN ELECTRIC HEATING COMPANY, OF MAINE.

ELECTRICALLY-HEATED SOLDERING-IRON.

SPECIFICATION forming part of Letters Patent No. 508,284, dated November 7, 1893.

Application filed December 10, 1892. Serial No. 454,770. (No model.)

*To all whom it may concern:*

Be it known that I, CHARLES L. COFFIN, of Detroit, in the county of Wayne and State of Michigan, have invented a new and useful Improvement in Electrically-Heated Soldering-Irons, of which the following is a specification.

My invention consists in an improvement in electrically heated soldering irons, hereinafter fully described and claimed.

The drawing is an elevation partly in section.

A represents the soldering head or point, usually made of copper, and secured to a shell E, which I prefer to make of iron.

B represents a plug of magnetic metal (iron), inserted within head A, and which may be in contact with said head or held just out of contact, as shown in the drawing.

F represents a coil of wire, which if desired may be iron wire, to form a heating coil, or may be copper wire to avoid becoming heated, and is coiled around an iron core C, which may if desired, be formed in part by a layer of iron wire D, between the solid part C and coil F, or be composed wholly of wires. $x$ and $y$ represent the terminals of coil F. For convenince in assembling one end of core C may be fastened into plug B and the other end may pass through an insulating plug I in shell E, and be secured at its other end by a nut N.

R represents a shank secured to insulation I and provided with a handle H.

In using this iron, the coil F is to be subjected to alternating, or to a pulsating, or an intermittent, or a vibrating, or an undulating or a broken current of electricity, whereby it constitutes an induction apparatus, and secondary currents will be generated in the shell E, which in this case will act as a secondary of an induction coil. The core C will become more or less heated, and the core B by being alternately magnetized and demagnetized, or by reversals of its magnetic polarity becomes highly heated, viz: within the soldering head A. By this device I am enabled to secure a highly heated body located immediately in the soldering head, and this is obtained without recourse to electrical resistance coils supplied direct from the source of energy, as is necessary in other electrical soldering irons, wherein the heating coil is carried down into the head, offering structural difficulties and requiring great care in insulation. It is obvious that the coil F may constitute the resistance or heating coil as in ordinary electrically heated tools. While it is convenient to connect the plug B with core C, it is not necessary to do so, it being only necessary that the plug B shall be in such relation to the induction apparatus that it will be magnetized thereby.

What I claim as my invention, and desire to secure by Letters Patent, is—

1. In combination with a magnetic body located within the soldering head of a soldering iron, an induction apparatus, substantially as described.

2. In an electrically heated soldering iron the combination of an induction apparatus inclosed within the shell or secondary, with a soldering head, and a core of magnetic material within said head, substantially as shown and described.

3. In an electrically-heated tool, the combination with an induction apparatus, of a hollow soldering head, and a magnetic body located within said head, substantially as shown and described.

CHARLES L. COFFIN.

Witnesses:
GERTRUDE H. ANDERSON,
GEO. H. LOTHROP.